US011947323B2

United States Patent
Zadorojniy et al.

(10) Patent No.: US 11,947,323 B2
(45) Date of Patent: Apr. 2, 2024

(54) REWARD TO RISK RATIO MAXIMIZATION IN OPERATIONAL CONTROL PROBLEMS

(71) Applicant: International Business Machines Corporation, Armonk, NY (US)

(72) Inventors: Alexander Zadorojniy, Haifa (IL); Takayuki Osogami, Japan (IL)

(*) Notice: Subject to any disclaimer, the term of this patent is extended or adjusted under 35 U.S.C. 154(b) by 433 days.

(21) Appl. No.: 17/503,284

(22) Filed: Oct. 16, 2021

(65) Prior Publication Data
US 2023/0124567 A1 Apr. 20, 2023

(51) Int. Cl.
*G05B 13/04* (2006.01)
*C02F 1/00* (2023.01)

(52) U.S. Cl.
CPC ............ *G05B 13/041* (2013.01); *C02F 1/008* (2013.01)

(58) Field of Classification Search
CPC ....... G05B 13/041; G05B 13/02; C02F 1/008; C02F 2209/001; C02F 2209/003; C02F 2209/006; C02F 2209/008; C02F 3/006
USPC .......................................................... 700/51
See application file for complete search history.

(56) References Cited

U.S. PATENT DOCUMENTS

| | | | | |
|---|---|---|---|---|
| 8,293,097 B2* | 10/2012 | Bowers, Jr. | ............ | C02F 1/5209 348/81 |
| 2012/0072259 A1 | 3/2012 | Morimura | | |
| 2012/0150570 A1 | 6/2012 | Samad-Khan | | |
| 2017/0061309 A1* | 3/2017 | Wasserkrug | ............ | C02F 3/006 |
| 2021/0350049 A1* | 11/2021 | Zadorojniy | ........ | G05B 13/0265 |

OTHER PUBLICATIONS

Constantine Caramanis et al, "Efficient Algorithms for Budget-Constrained Markov Decision Processes"; IEEE Transactions on Automatic Control, vol. 59, No. 10, pp. 2813-2817, Oct. 2014.
Frits de Nijs et al, "Constrained Multiagent Markov Decision Processes: a Taxonomy of Problems and Algorithms"; Journal of Artificial Intelligence Research 70 (2021) 955-1001, Mar. 8, 2021.
Guy Even et al, "Strong polynomiality of the Gass-Saaty shadow-vertex pivoting rule for controlled random walks"; Ann Oper Res (2012) 201:159-167, Aug. 1, 2012.
(Continued)

*Primary Examiner* — Chun Cao
(74) *Attorney, Agent, or Firm* — Dvir Gassner

(57) ABSTRACT

A computer-implemented method comprising: receiving data associated with an operational control problem; formulating the operation control problem as an optimization problem; recursively generating a sequence of policies of operational control associated with the operational control problem, wherein each subsequent policy in the sequence is constructed by modifying one or more actions at a single state in a preceding policy in the sequence, and wherein the modifying monotonically changes a risk associated with the subsequent policy; constructing, from the sequence of policies, an optimal solution path, wherein each vertex on the optimal solution path represents an optimal solution to the operational control problem; calculating a ratio of reward to risk for each of the vertices on the path; and selecting one of the policies in the sequence to apply to the operational control problem, based, at least in part, on the calculated ratios.

20 Claims, 4 Drawing Sheets

(56) References Cited

OTHER PUBLICATIONS

Michael Masin et al, "Diversity maximization approach for multiobjective optimization"; Operations Research 56(2):411-424. Aug. 3, 2007.

Ruchika Sehgal et al., "Robust reward-risk ratio portfolio optimization"; Intl. Trans. in Op. Res. 28 (2021) 2169-2190. Jun. 12, 2018.

Shie Mannor et al., "Mean-Variance Optimization in Markov Decision Processes" ICML, Online at: https://arxiv.org/abs/1104.5601 Apr. 29, 2011.

Wlodzimierz Ogryczak et al., "Efficient optimization of the reward-risk ratio with polyhedral risk measures"; Math Meth Oper Res (2017) 86:625-653. Nov. 14, 2016.

Yinyu Ye, "The simplex method is strongly polynomial for the Markov decision problem with a fixed discount rate"; Stanford University, May 14, 2010.

Zadorojniy et al., "Unleashing Analytics to Reduce Costs and Improve Quality in Wastewater Treatment"; Informs Journal on Applied Analytics Articles in Advance, pp. 1-7, Apr. 1, 2018.

Zadorojniy et al., "A Strongly Polynomial Algorithm for Controlled Queues"; Mathematics of Operations Research vol. 34, No. 4, Nov. 2009, pp. 992-1007.

\* cited by examiner

REWARD TO RISK RATIO MAXIMIZATION IN OPERATIONAL CONTROL PROBLEMS

BACKGROUND

The invention relates to the field of operational and industrial automation.

A Markov decision process is a stochastic decision-making process. A typical problem formulated as a Markov decision process has widespread application in areas such as robotics, industrial processes, operational control, manufacturing, finance and economics, and the like.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a system comprising at least one hardware processor; and a non-transitory computer-readable storage medium having stored thereon program instructions, the program instructions executable by the at least one hardware processor to: receive data associated with an operational control problem, formulate the operation control problem as an optimization problem, recursively generate a sequence of policies of operational control associated with the operational control problem, wherein each subsequent policy in the sequence is constructed by modifying one or more actions at a single state in a preceding policy in the sequence, and wherein the modifying monotonically changes a risk associated with the subsequent policy, construct, from the sequence of policies, an optimal solution path, wherein each vertex on the optimal solution path represents an optimal solution to the operational control problem, calculate a ratio of reward to risk for each of the vertices on the path, and select one of the policies in the sequence to apply to the operational control problem, based, at least in part, on the calculated ratios.

There is also provided, in an embodiment, a computer-implemented method comprising: receiving data associated with an operational control problem; formulating the operation control problem as an optimization problem; recursively generating a sequence of policies of operational control associated with the operational control problem, wherein each subsequent policy in the sequence is constructed by modifying one or more actions at a single state in a preceding policy in the sequence, and wherein the modifying monotonically changes a risk associated with the subsequent policy; constructing, from the sequence of policies, an optimal solution path, wherein each vertex on the optimal solution path represents an optimal solution to the operational control problem; calculating a ratio of reward to risk for each of the vertices on the path; and selecting one of the policies in the sequence to apply to the operational control problem, based, at least in part, on the calculated ratios.

There is further provided, in an embodiment, a computer program product comprising a non-transitory computer-readable storage medium having program instructions embodied therewith, the program instructions executable by at least one hardware processor to: receive data associated with an operational control problem; formulate the operation control problem as an optimization problem; recursively generate a sequence of policies of operational control associated with the operational control problem, wherein each subsequent policy in the sequence is constructed by modifying one or more actions at a single state in a preceding policy in the sequence, and wherein the modifying monotonically changes a risk associated with the subsequent policy; construct, from the sequence of policies, an optimal solution path, wherein each vertex on the optimal solution path represents an optimal solution to the operational control problem; calculate a ratio of reward to risk for each of the vertices on the path; and select one of the policies in the sequence to apply to the operational control problem, based, at least in part, on the calculated ratios.

In some embodiments, the formulating comprises: (i) formulating the optimization problem as an equivalent problem of continuum of constrained Markov Decision Processes (CMDP); (ii) representing each of the CMDPs as a dual linear programming (LP) problem; and (iii) solving each of the dual LP problems iteratively for every possible constraint value.

In some embodiments, the risk associated with the policy is represented as an expected value of a quadratic function of a reward.

In some embodiments, the solving comprises creating a linear approximation of at least one of the risk and the reward.

In some embodiments, the operational control problem relates to the operation of a wastewater treatment plant.

In some embodiments, the program instructions are further executable to generate, and the method further comprises generating, a Pareto frontier of the calculated ratios.

In some embodiments, the generating continues until one of: a maximum value of the risk is reached, and a predetermined maximal number of recursions is reached.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
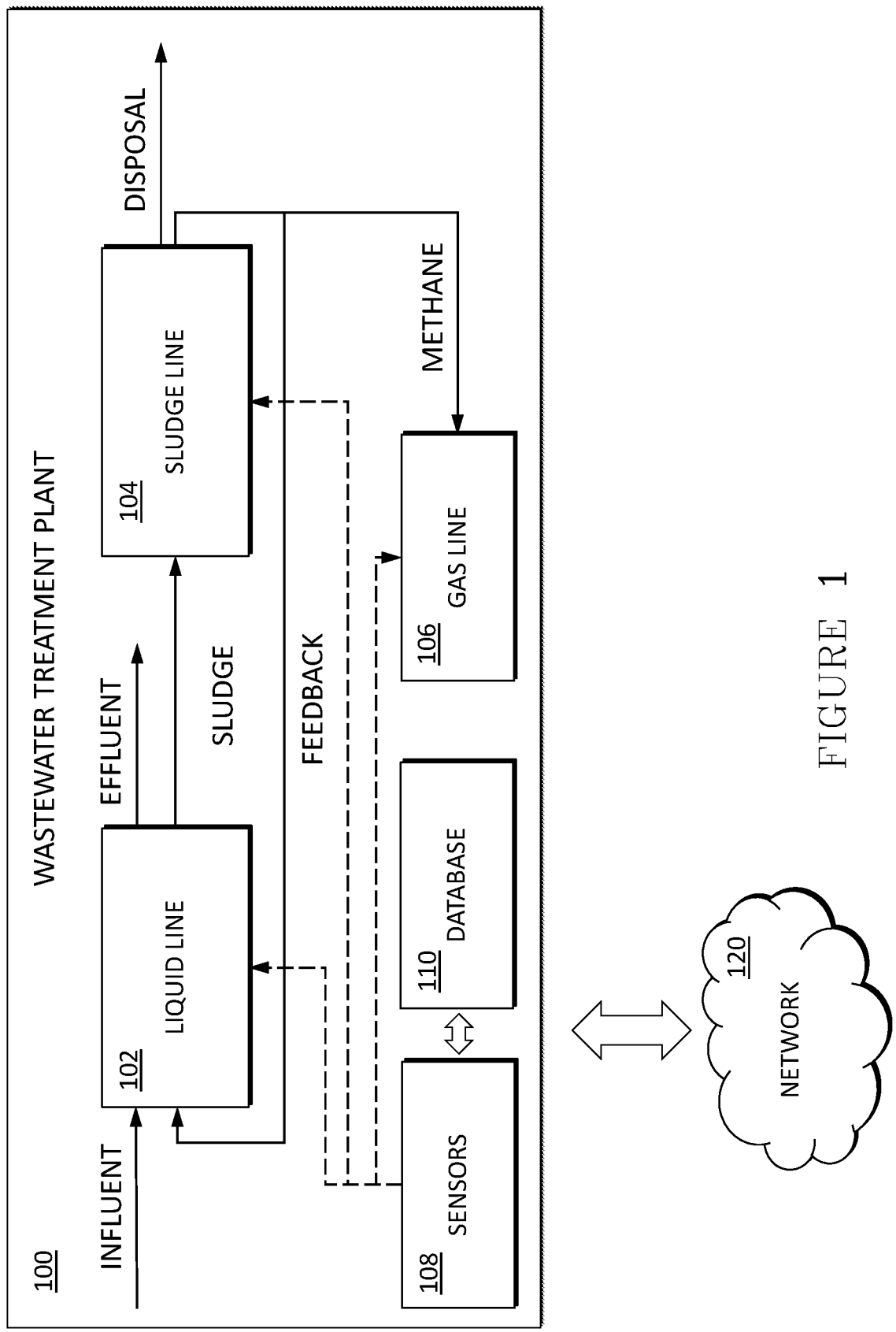
FIG. 1 is a schematic illustration of lines of an exemplary wastewater treatment plant.

Disclosed herein is a technique, embodied in a method, system and a computer program product, for maximization of a risk-reward ratio in operational control problems.

In some embodiments, the present disclosure provides for solving a Markov Decision Process (MDP) problem, with an objective function represented as a ratio of expectation of the reward R (which may be reflected as minimization of cost C) to the expectation of risk D. In some embodiments, the present disclosure provides for computing optimal policies of Markov Decision Processes (MDPs), via a reduction to a continuum of constrained MDPs (CMDPs), such that the optimal policies for these CMDPs constitute a path in a graph defined over the deterministic policies. In some embodiments, this path contains an optimal policy of the original problem. In some embodiments, the present disclosure provides for an algorithm which computes this path, and thus an optimal policy.

In some embodiments, the present disclosure provides for formulating an operational control problem of maximizing the ratio of reward R (e.g., which may be reflected as a minimization of costs C) to risk D, by reducing the problem to an equivalent problem comprising a continuum of single Constrained Markov Decision Processes (CMDPs) with one constraint D representing risk. In some embodiments, the present disclosure then provides for formulating each single CMDP problem as a dual-linear programming (LP) CMDP problem represented using five tuples {S,A,P,c,d} representing a finite set of states, a finite set of actions, a transition probability matrix, immediate reward (i.e., minimization of cost), and immediate cost corresponding to a constraint. In some embodiments, the present disclosure uses a discounted or expected average cost model. In some embodiments, the present disclosure then provides for solving the problem by applying an iterative algorithm which computes the optimal reward R (which may be reflected as minimization of cost C) for every possible constraint value (risk) D. The present algorithm initializes by finding a policy corresponding to a $D_{min}$ and calculating the corresponding optimal reward (minimized cost) value C. The present algorithm then iteratively computes C for each D value, until it reaches a maximum risk constraint value $D_{max}$ (or another stopping condition, such as a maximal number of iterations of the algorithm). The present disclosure then calculates the ratio C/D for each vertex on the path. In some embodiments, the present disclosure further provides for finding a Pareto frontier of the risk-reward ratio.

This disclosure will discuss extensively, by way of example only, applications of the present method in conjunction with the operational control problem of managing wastewater treatment plants (WWTP). However, the present method may be equally successfully applied in various additional fields, including, but not limited to, other operational control problems, industrial processes, manufacturing processes, financial and economic decision-making processes, and the like.

Accordingly, in some embodiments of the present invention, there are provided methods and systems for maximizing a ratio of reward to risk in the context of operational control of a WWTP.

By way of background, WWTPs are complex enterprises which pose significant optimization problems. FIG. 1 is a schematic illustration of an exemplary WWTP 100. As can be seen, WWTP 100 consists of three main operational units connected in series, with possible feedbacks between the units—a liquid line 102, a sludge line 104, and a gas line 106. The sewage intended for treatment, also known as influent, first enters the liquid line 102 of WWTP 100. The outputs of this unit are treated water, or effluent, which must meet regulatory constraints, and a mass of treated biosolids called sludge. The sludge is moved to the sludge line 104 of the plant, which treats the solids so they can be either used as fertilizer or safely disposed of. The liquids output by the sludge line are recycled back to the input of the liquid line 102. Methane gas, another output produced by the sludge line, is passed on to the third unit of the plant—the gas line 106. The gas line either stores the gas or transforms it into electricity. One major challenge is the cost-effective operation of the WWTP while maintaining regulatory constraints regarding the minimum quality requirements applicable to treated wastewater and sludge. First, there are numerous control options in each such plant. In addition, the input to the plant (the influent) presents large daily variations in composition. Moreover, the processes in the plant are complex biological, physical, and chemical processes, usually modeled as a set of first order differential equations. While the effect of some control actions may be felt within minutes or hours, the effects of others, especially in the sludge line, may only be felt in a matter of days.

The two main outputs of WWTP 100—effluent and sludge—both must meet regulatory constraints specific to the plant's location and applicable regulatory environment. One example of such a constraint is, e.g., a maximum monthly average of total nitrogen in the effluent. Treatment of the wastewater is carried out in a complex set of steps, in which the wastewater is treated by means of complex biological, physical, and chemical processes. Moreover, there are feedback loops in the process, so that the same wastewater goes through some of the steps multiple times. This complex process incurs high operating costs, including electricity required to treat and pump the wastewater throughout the process; various chemicals required in the treatment process; and sludge disposal. These costs can be reduced by improved operational management of the treatment process. Moreover, in some plants, biogas may be generated as a part of the treatment process, which may then be used to generate electricity and further reduce the costs. However, it is difficult to efficiently operate the process due both to its complex nature and the large number of operational decisions that must be made.

As noted above, WWTP 100 process can be subdivided into three sub-processes, or lines:

The liquid line 102 is the part of the process into which the influent enters the plant. The main focus of this line is to treat the liquid part of the wastewater. This is carried out by physical, chemical, and/or biological treatments.

The sludge line 104 process separates the liquids from the solids, and the sludge undergoes an additional processing to obtain sludge which can be reused, e.g., as fuel or fertilizer, or disposed of safely.

The gas line 106 either stores the gas or transforms.

The costs of running a WWTP comprise operational electricity costs, gas costs, treatment chemicals costs, and sludge disposal costs. In some cases, gas costs may be negative, i.e., when the byproduct methane gas is used to produce electricity. The constraints (risks) of running a WWTP are determined by effluent quality requirements set by applicable regulation based, e.g., effluent composition (for example, total effluent nitrogen content, etc.). The control actions associated with a WWTP may comprise decision points such as amounts of fluid pumping aeration used during treatment (which determine electricity consumption), feedback flow levels, chemical dosing, etc.

Figure 2:
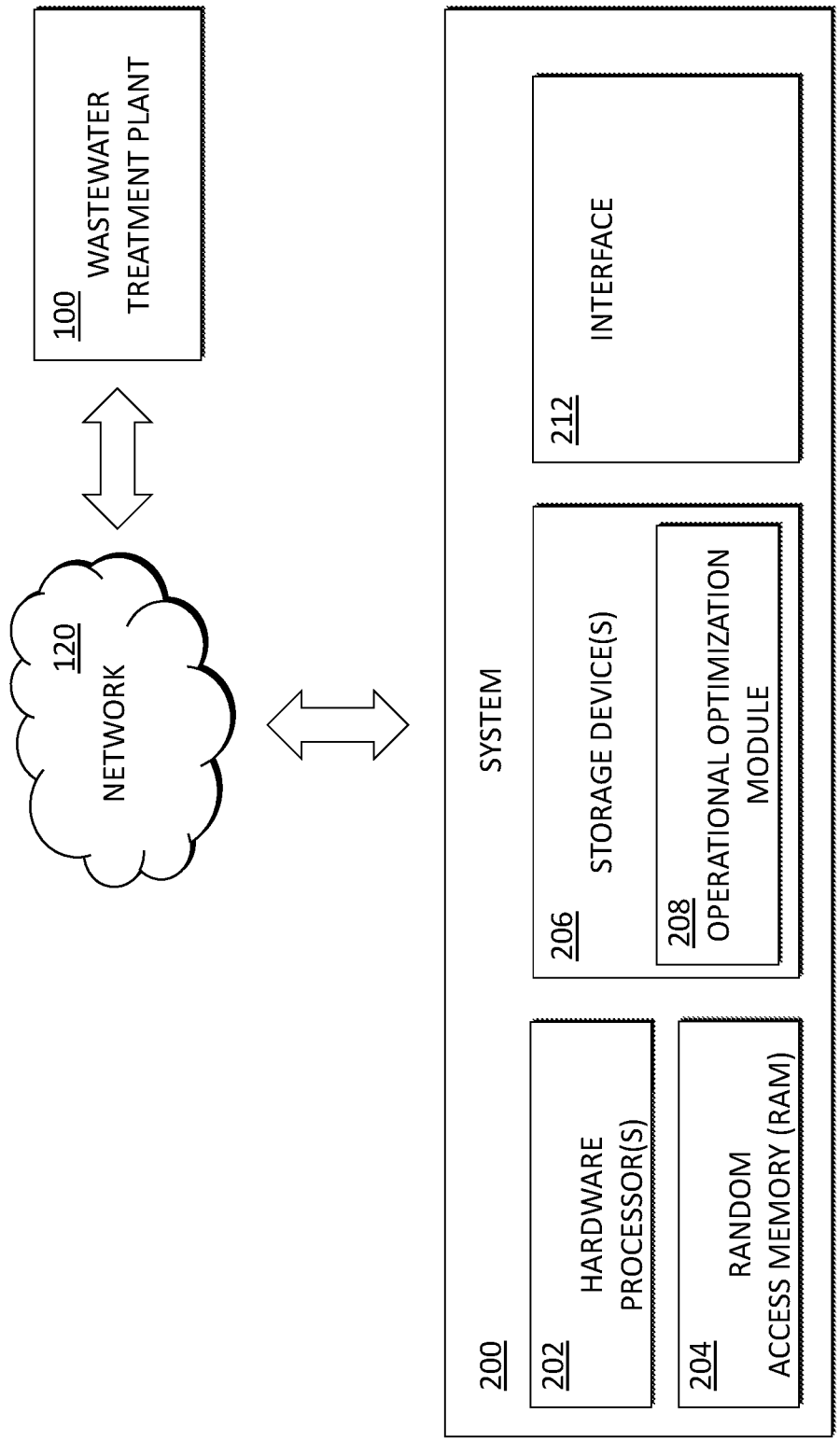
FIG. 2 is a block diagram of an exemplary system for maximization of a risk-reward ratio in operational control problems, for instance by implementing the wastewater treatment process depicted in FIG. 1, according to some embodiments of the present disclosure.
Figure 3:
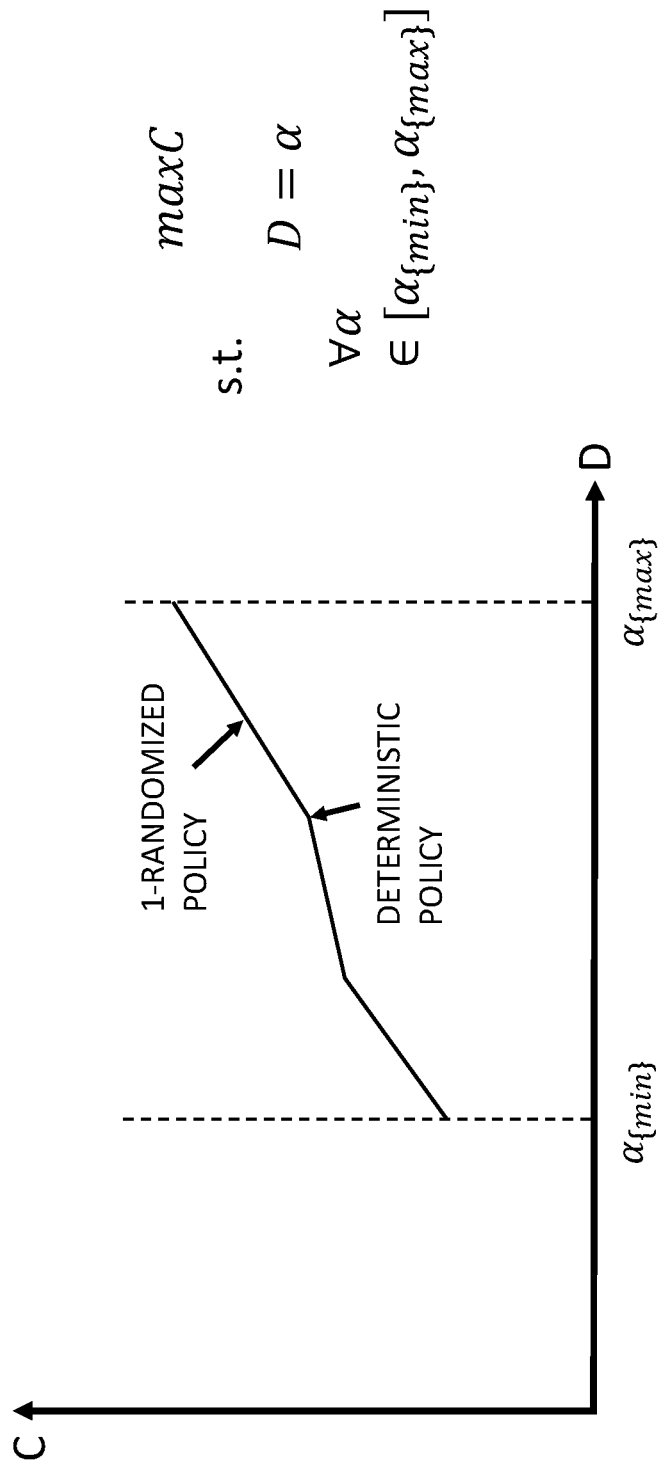
FIG. 3 shows the piecewise linear dependency between numerator cost and reward, according to some embodiments of the present disclosure.

FIG. 2 is a block diagram of an exemplary system 200 for maximization of a risk-reward ratio in operational control problems, for instance by implementing the wastewater treatment process depicted in FIG. 1, according to some embodiments of the present disclosure.

System 200 may include one or more hardware processor(s) 202, a random-access memory (RAM) 204, and one or more non-transitory computer-readable storage device(s) 206. Storage device(s) 206 may have stored thereon program instructions and/or components configured to operate hardware processor(s) 202. The program instructions may include one or more software modules, such as an operational optimization module 208. The software components may include an operating system that has various software components and/or drivers for controlling and managing general system tasks (e.g., memory management, storage device control, power management, etc.), and facilitating communication between various hardware and software components. System 200 may operate by loading instructions of operational optimization module 208 and/or optimizer module 110 into RAM 204 as they are being executed by processor(s) 202.

In some embodiments, system 200 may include an interface 212 for receiving readings of sensor(s) 108 associated with WWTP 100 (shown in FIG. 1) located to directly observe and monitor a plurality of values associated with the operation of WWTP 100, e.g., influent variables, effluent variables, sludge variable, feedback flow channel variables, gas variable, etc. The interface 212 may also be used for acquiring historical operational data stored on database(s) 110 associated with WWTP 100, e.g., influent variables, effluent variables, sludge variable, feedback flow channel variables, gas variable, etc. In some embodiments, interface 212 may be used to acquire the sensors 108 and/or database(s) 110 data via a network 120, such as the internet.

System 200, as described herein, is only an exemplary embodiment of the present invention, and in practice may be implemented in hardware only, software only, or a combination of both hardware and software. System 200 may have more or fewer components and modules than shown, may combine two or more of the components, or may have a different configuration or arrangement of the components. System 200 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 200 may be co-located or distributed, or the system may be configured to run as one or more cloud computing "instances," "containers," "virtual machines," or other types of encapsulated software applications, as known in the art.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As noted above, in some embodiments, the present disclosure provides for a CMDP framework for computing an operational control policy which maximizes a reward-risk ratio. In some embodiments, the CMDP problem may be formulated as follows: Let $S_t$ be a random variable representing a state at time t, e.g., a state of a WWTP, such as WWTP 100 shown in FIG. 1. $A_t$ is a random variable representing an action at time t, R(s, a) is a random function representing the immediate reward from taking action a at state s, and $$r(s,a) \equiv E^R[R(S_t,A_t)|S_t=s, A_t=a]$$

is the immediate expected reward per pair of state and action (s, a), where $E^R$ denotes the expectation with respect to the distribution of the reward. The distribution of R is assumed to be independent of a policy (i.e., mapping of states to actions) applied.

In some embodiments, the present disclosure provides for two models of costs: discounted and expected average cost models. In some embodiments, occupation measures may be used in the present disclosure to represent these cost models in a unified manner. Specifically, let $$\rho(s,a) \equiv (1-\beta)\Sigma_{t=0}^{\infty}\beta^t \cdot P^\pi(s_t=s, a_t=a)$$

be the discounted cost model, and let $$\rho(s,a) \equiv \lim_{T \to \infty} \frac{\sum_{t<T} P^\pi(s_t=s, a_t=a)}{T}$$

be the expected average cost model. Then, each cost model may be represented with $$\mathfrak{r}(\pi) = E^{\pi,R}[R(S,A)]$$
$$= E^\pi[E^R[R(S,A)|S,A]]$$
$$= E^\pi[r(S,A)]$$
$$= r^\top \rho^\pi,$$

where $E^\pi$ denotes the expectation with respect to the corresponding occupation measure induced by $\pi$, and $r \in \mathbb{R}^{|S| \cdot |A|}$ represents the vector of immediate costs.

Likewise, the present disclosure provides for two models of risks: discounted and expected average risk models. These risk models may also be represented in a unified manner with occupation measures. Namely, $\mathfrak{d}(\pi) = d^\top \rho^\pi$, where $d \in \mathbb{R}^{|S| \cdot |A|}$ represents the vector of immediate risks. Here, d may be defined from R(s, a) or another random function of the state-action pair (s, a). For example, $d(s, a) = E^R[g(R(s, a))]$ for a function g.

In some embodiments, it is assumed that the associated processes are Markovian (this can be achieved by increasing the state space, if needed) and the problem can be modelled as an MDP where, instead of standard expected reward maximization or cost minimization, the objective is the maximization of the ratio of the expected cost $\mathfrak{r}(\pi)$ to the expected risk $\mathfrak{d}(\pi)$:

$$\max\left\{\frac{\mathfrak{r}(\pi)}{\mathfrak{d}(\pi)} \mid A\rho^\pi = b, \rho^\pi \geq 0\right\},$$

where matrix A and vector b are defined differently between the two cost/risk models. For the discounted cost/risk model, $A = I - \beta \cdot P$, and b is the initial state distribution. For the expected average cost/risk model, $A = I - P$ with one additional row of all ones, and b is 1 only at the place related to the row of all ones in A, with remaining entries being 0.

To solve the aforementioned problem, the present disclosure may apply Constrained MDP (CMDP), wherein its linear programming (LP) formulation is as follows: CMDP is a five-tuple ⟨S, A, P, c, d⟩ of finite set of states, finite set of actions, transition probability matrix, immediate cost of reward and immediate cost corresponding to a constraint (in general it can be a vector of costs but in this paper we are interested in just one constraint). An LP formulation of CMDP may be denoted by LP(α), $$\max\{\mathfrak{r}(\pi) | A\rho^\pi = b, \mathfrak{d}(\pi) = \alpha, \rho^\pi \geq 0\}$$

In some embodiments, the present disclosure maximizes the immediate reward per unit of risk, which is defined as R(s, a). In some embodiments, the present disclosure further provides for a linear approximation of variance (linearized variance) of the immediate reward:

$$\mathrm{Var}[R] = E[R^2] - (E[R])^2 \approx E[R^2] - (a^2 + 2a(E[R] - a)) =$$
$$= E[R^2 - 2aR - a^2]$$

where a is a constant, e.g., a known historical expectation. The linearized variance can be represented as the expected value of random variables. Thus, the present disclosure introduces a new state variable $f = R^2 - 2aR - a^2$, wherein f can be estimated from, e.g., historical data, and wherein $C(\bullet) = E[R]$ and $D(\bullet) = E[f]$.

In some embodiments, the present disclosure provides for a strongly polynomial algorithm for ratio maximization of the expected reward to risk. Accordingly, in some embodiments, let $\pi^{s,a}$ be a deterministic policy such that it follows π except at state s, when action a is taken, denoted by:

$$\nabla_{s,a} \equiv \frac{R(\pi^{s,a}) - R(\pi)}{D(\pi^{s,a}) - D(\pi)}$$

where $\rho^\pi$ is the occupation measure induced by π.

In some embodiments, the present algorithm initializes, at line 1, a policy with the policy that corresponds to the minimum value of D(π). When monotonicity assumptions are satisfied, this policy is trivially known and corresponds to the smallest action according to the partial natural order at each state. When the assumptions are not satisfied, this policy can be found by simply solving following MDP, $$\pi_{\alpha_{min}} = \arg\min\{d_f \rho | A\rho = b, \rho \geq 0\}$$

Then, at line 2, this policy is added to a set of policies that will be used later to find maximal ratio. At lines 3-6, there is a loop where next optimal policy is found and added to the set of candidate policies for the maximal ratio. At line 7, a policy that corresponds to the maximal ratio is found.

In some embodiments, an algorithm of the present disclosure may be represented as:

---
Algorithm 1:
---
1: Initialize
   π ← (0, . . ., 0){π selects the "zero" action in each state}
2: {Π, ℜ, 𝔇} ← (π, 𝔯(π), 𝔡(π))}
3: while ∃ (s, a) s.t. 𝔡(π^{s,a}) > 𝔡(π) do
4:   π^{s,a} ← argmax{V_{s,a} 𝔡(π^{s,a}) > 𝔡(π)}
5:   Add [π^{s,a}, 𝔯(π^{s,a}), 𝔡(π^{s,a})} into {Π, ℜ, 𝔇}
6: end while
7: return argmax{𝔯(π)𝔡(π) | {π, 𝔯(π), 𝔡(π)} ∈ {Π, ℜ, 𝔇}
---

Figure 4:
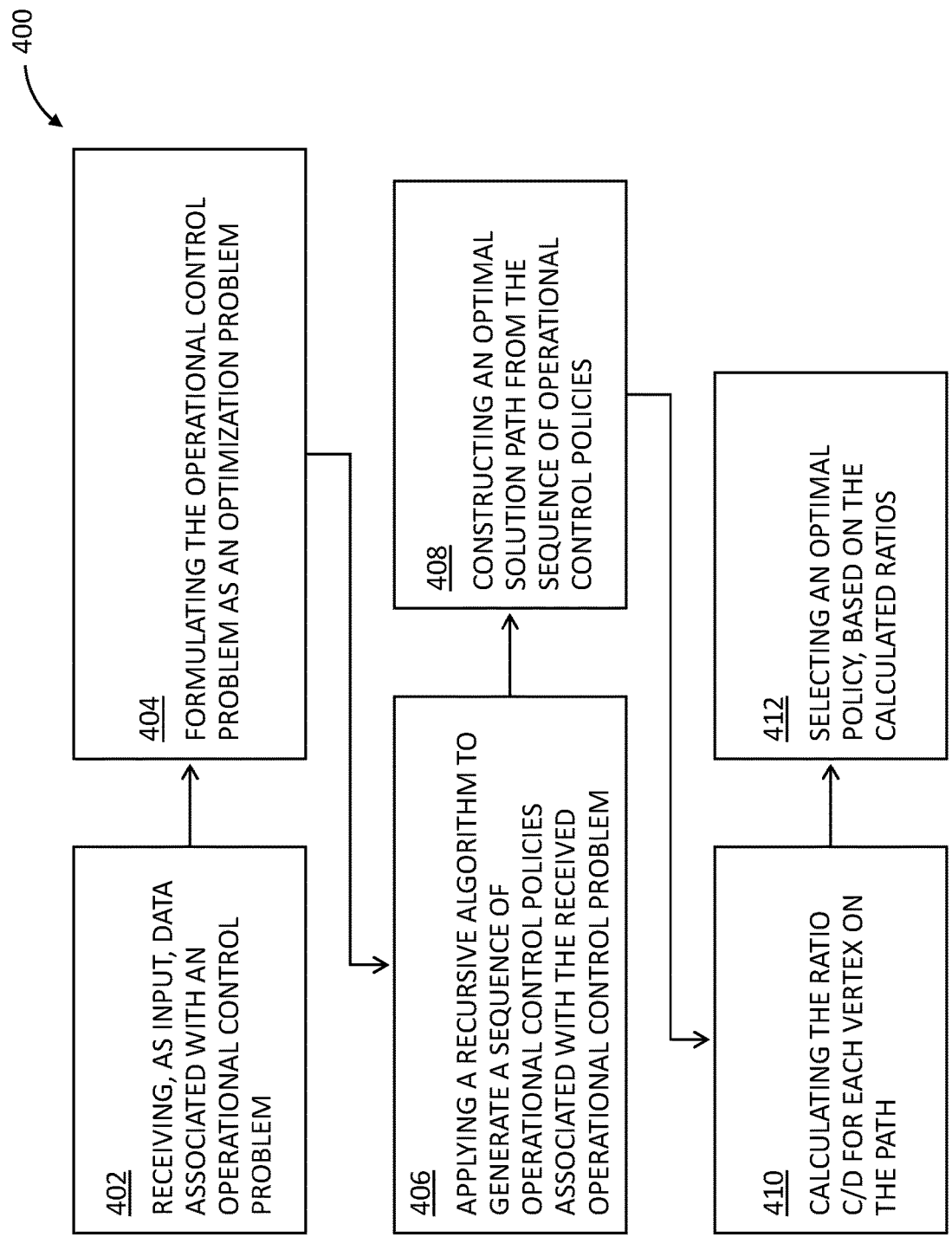
FIG. 4 is a flowchart of the functional steps in an example method for maximization of a risk-reward ratio in operational control problems, for instance by implementing the wastewater treatment process depicted in FIG. 1, according to some embodiments of the present disclosure.

The instructions of operational optimization module 208 of system 200 (shown in FIG. 2) will now be discussed with reference to the flowchart of FIG. 4, which illustrates the functional steps in a method 400 for maximization of a risk-reward ratio in operational control problems, for instance by implementing the wastewater treatment process depicted in FIG. 1, according to some embodiments of the present disclosure. Method 400 will be discussed over the course of the following paragraphs with continued reference to FIGS. 1 and 2. The various steps of method 400 may either be performed in the order they are presented or in a different order (or even in parallel), as long as the order allows for a necessary input to a certain step to be obtained from an output of an earlier step. In addition, the steps of method 400 are performed automatically (e.g., by system 200 of FIG. 2), unless specifically stated otherwise.

Processing begins at step 402, wherein system 200 may acquire or receive, through interface 212, historical operational data stored on database(s) 110 associated with WWTP 100, e.g., influent variables, effluent variables, sludge variable, feedback flow channel variables, gas variable, etc.

In some embodiments, in step 404, the present disclosure provides for formulating an operational control problem, e.g., an operational control problem associated with operating WWTP 100, as an optimization problem.

For example, in some embodiments, the present disclosure provides for formulating said operational control problem as an equivalent problem of continuum of constrained Markov Decision Processes (CMDP), wherein each of said CMDPs is represented as a dual linear programming (LP) problem, and wherein each of the dual LP problems may be solved recursively for every possible constraint value. Thus, for example, in some embodiments, a continuum of CMDP problems may be represented with five tuples {S,A,P,c,d} representing a finite set of states, a finite set of actions, a transition probability matrix, an immediate reward (which may be reflected as minimization of cost), and an immediate cost corresponding to a constraint (risk). In some embodiments, each of the CMDP problems in the continuum may be formulated as a linear programming (LP) problem. In some embodiments, C represents expectation of a reward $C(\bullet) = E[R]$, and D is expectation of a function of a reward $D(\bullet) = E[f]$. In some embodiments, E[f] can be minimized directly and then the corresponding E[R] may be calculated. Thus, the optimal path can start from $\alpha_{\{min\}}$.

In some embodiments, in step 406, the present disclosure provides for solving the formulated CMDP problem for every possible D value. In some embodiments, the present disclosure provides for recursively generating a sequence of policies of operational control associated with the received operational control problem, wherein each subsequent policy in the sequence is constructed by modifying one or more actions at a single state in a preceding policy in the sequence, and wherein the modifying monotonically changes a risk associated with the subsequent policy. Accordingly, in some embodiments, the present disclosure provides for applying a recursive algorithm, for example, Algorithm 1 presented hereinabove, which computes the optimal reward C for every possible constraint value (risk) D. The present algorithm initializes by finding a $D_{min}$ and the corresponding optimal reward value C. The present algorithm then iteratively computes C for each D value, until it reaches a maximum risk constraint value $D_{max}$ or another stopping condition, such as a maximal number of iterations of the algorithm).

In some embodiments, the present disclosure optionally provides for a linear approximation of variance (linearized variance) of the immediate reward and/or the risk, for example, using a Taylor expansion function.

In some embodiments, in step 408, the present disclosure provides for constructing an optimal solution path from the sequence of policies generated in step 406, wherein each vertex on the optimal solution path represents an optimal solution to said operational control problem. In some embodiments, the present disclosure limits the solution only to deterministic policies which correspond to the vertices on this path.

In some embodiments, in step 410, the present disclosure then calculates the ratio C/D for each vertex on the path. In some embodiments, the present disclosure further provides for finding a Pareto frontier of the risk-reward ratio.

In some embodiments, in step 412, an operational control policy which maximizes a reward-risk ratio may be selected based, at least in part, on the ratios calculated in step 410.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, a field-programmable gate array (FPGA), or a programmable logic array (PLA) may execute the computer readable program instructions by utilizing state information of the computer readable program instructions to personalize the electronic circuitry, in order to perform aspects of the present invention. In some embodiments, electronic circuitry including, for example, an application-specific integrated circuit (ASIC), may be incorporate the computer readable program instructions already at time of fabrication, such that the ASIC is configured to execute these instructions without programming.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range-10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A system comprising:
   at least one hardware processor; and
   a non-transitory computer-readable storage medium having stored thereon program instructions, the program instructions executable by the at least one hardware processor to:
   receive data associated with an operational control problem,
   formulate said operation control problem as an optimization problem,
   recursively generate a sequence of policies of operational control associated with said operational control problem, wherein each subsequent policy in said sequence is constructed by modifying one or more actions at a single state in a preceding policy in said sequence, and wherein said modifying monotonically changes a risk associated with said subsequent policy,
   construct, from said sequence of policies, an optimal solution path, wherein each vertex on said optimal solution path represents an optimal solution to said operational control problem,
   calculate a ratio of reward to risk for each of said vertices on said path, and
   select one of said policies in said sequence to apply to said operational control problem, based, at least in part, on said calculated ratios.

2. The system of claim 1, wherein said formulating comprises:
   (i) formulating said optimization problem as an equivalent problem of continuum of constrained Markov Decision Processes (CMDP);
   (ii) representing each of said CMDPs as a dual linear programming (LP) problem; and
   (iii) solving each of said dual LP problems iteratively for every possible constraint value.

3. The system of claim 2, wherein said risk associated with a said policy is represented as an expected value of a quadratic function of a reward.

4. The system of claim 3, wherein said solving comprises creating a linear approximation of at least one of said risk and said reward.

5. The system of claim 1, wherein said operational control problem relates to the operation of a wastewater treatment plant.

6. The system of claim 1, wherein said program instructions are further executable to generate a Pareto frontier of said calculated ratios.

7. The system of claim 1, wherein said generating continues until one of: a maximum value of said risk is reached, and a predetermined maximal number of recursions is reached.

8. A computer-implemented method comprising:
   receiving data associated with an operational control problem;
   formulating said operation control problem as an optimization problem;
   recursively generating a sequence of policies of operational control associated with said operational control problem, wherein each subsequent policy in said sequence is constructed by modifying one or more actions at a single state in a preceding policy in said sequence, and wherein said modifying monotonically changes a risk associated with said subsequent policy;
   constructing, from said sequence of policies, an optimal solution path, wherein each vertex on said optimal solution path represents an optimal solution to said operational control problem;
   calculating a ratio of reward to risk for each of said vertices on said path; and
   selecting one of said policies in said sequence to apply to said operational control problem, based, at least in part, on said calculated ratios.

9. The computer-implemented method of claim 8, wherein said formulating comprises:
   (i) formulating said optimization problem as an equivalent problem of continuum of constrained Markov Decision Processes (CMDP);
   (ii) representing each of said CMDPs as a dual linear programming (LP) problem; and
   (iii) solving each of said dual LP problems iteratively for every possible constraint value.

10. The computer-implemented method of claim 9, wherein said risk associated with a said policy is represented as an expected value of a quadratic function of a reward.

11. The computer-implemented method of claim 10, wherein said solving comprises creating a linear approximation of at least one of said risk and said reward.

12. The computer-implemented method of claim 8, wherein said operational control problem relates to the operation of a wastewater treatment plant.

13. The computer-implemented method of claim 8, further comprising generating a Pareto frontier of said calculated ratios.

14. The computer-implemented method of claim 8, wherein said generating continues until one of: a maximum value of said risk is reached, and a predetermined maximal number of recursions is reached.

15. A computer program product comprising a non-transitory computer-readable storage medium having program instructions embodied therewith, the program instructions executable by at least one hardware processor to:
receive data associated with an operational control problem;
formulate said operation control problem as an optimization problem;
recursively generate a sequence of policies of operational control associated with said operational control problem, wherein each subsequent policy in said sequence is constructed by modifying one or more actions at a single state in a preceding policy in said sequence, and wherein said modifying monotonically changes a risk associated with said subsequent policy;
construct, from said sequence of policies, an optimal solution path, wherein each vertex on said optimal solution path represents an optimal solution to said operational control problem;
calculate a ratio of reward to risk for each of said vertices on said path; and
select one of said policies in said sequence to apply to said operational control problem, based, at least in part, on said calculated ratios.

16. The computer program product of claim 15, wherein said formulating comprises:
(i) formulating said optimization problem as an equivalent problem of continuum of constrained Markov Decision Processes (CMDP);
(ii) representing each of said CMDPs as a dual linear programming (LP) problem; and
(iii) solving each of said dual LP problems iteratively for every possible constraint value.

17. The computer program product of claim 16, wherein said risk associated with a said policy is represented as an expected value of a quadratic function of a reward.

18. The computer program product of claim 17, wherein said solving comprises creating a linear approximation of at least one of said risk and said reward.

19. The computer program product of claim 15, wherein said operational control problem relates to the operation of a wastewater treatment plant.

20. The computer program product of claim 15, wherein said program instructions are further executable to generate a Pareto frontier of said calculated ratios.

* * * * *